June 18, 1940.  T. C. BUSHONG  2,204,569
AGRICULTURAL MACHINE
Filed Feb. 23, 1939   3 Sheets-Sheet 2
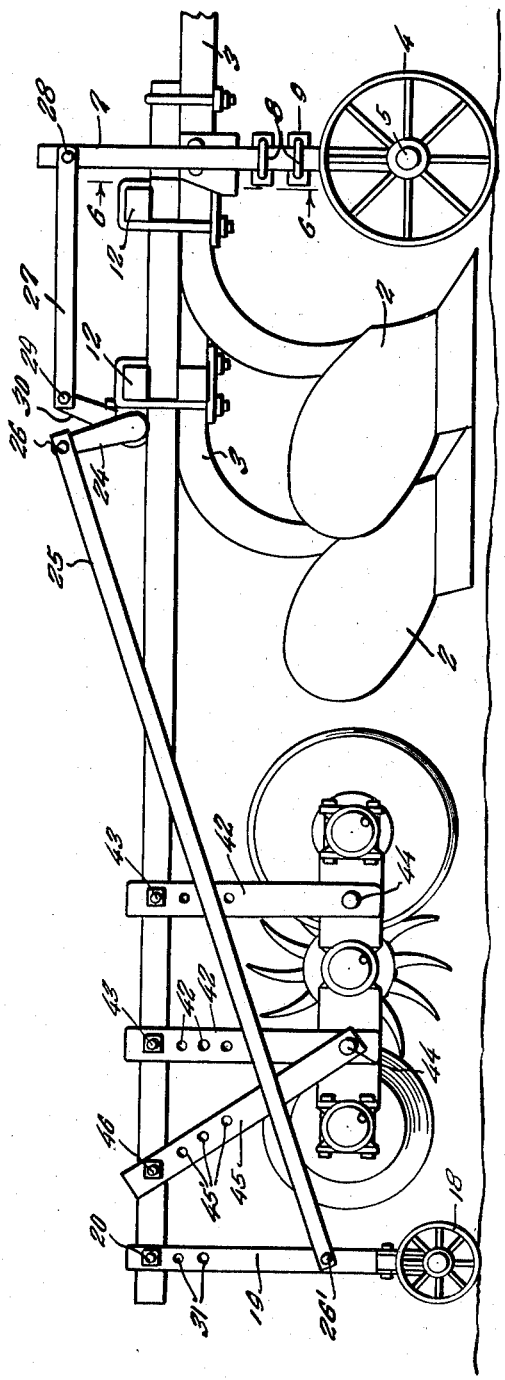
Inventor
T. C. Bushong
By Clarence A. O'Brien
and Hyman Berman
Attorneys

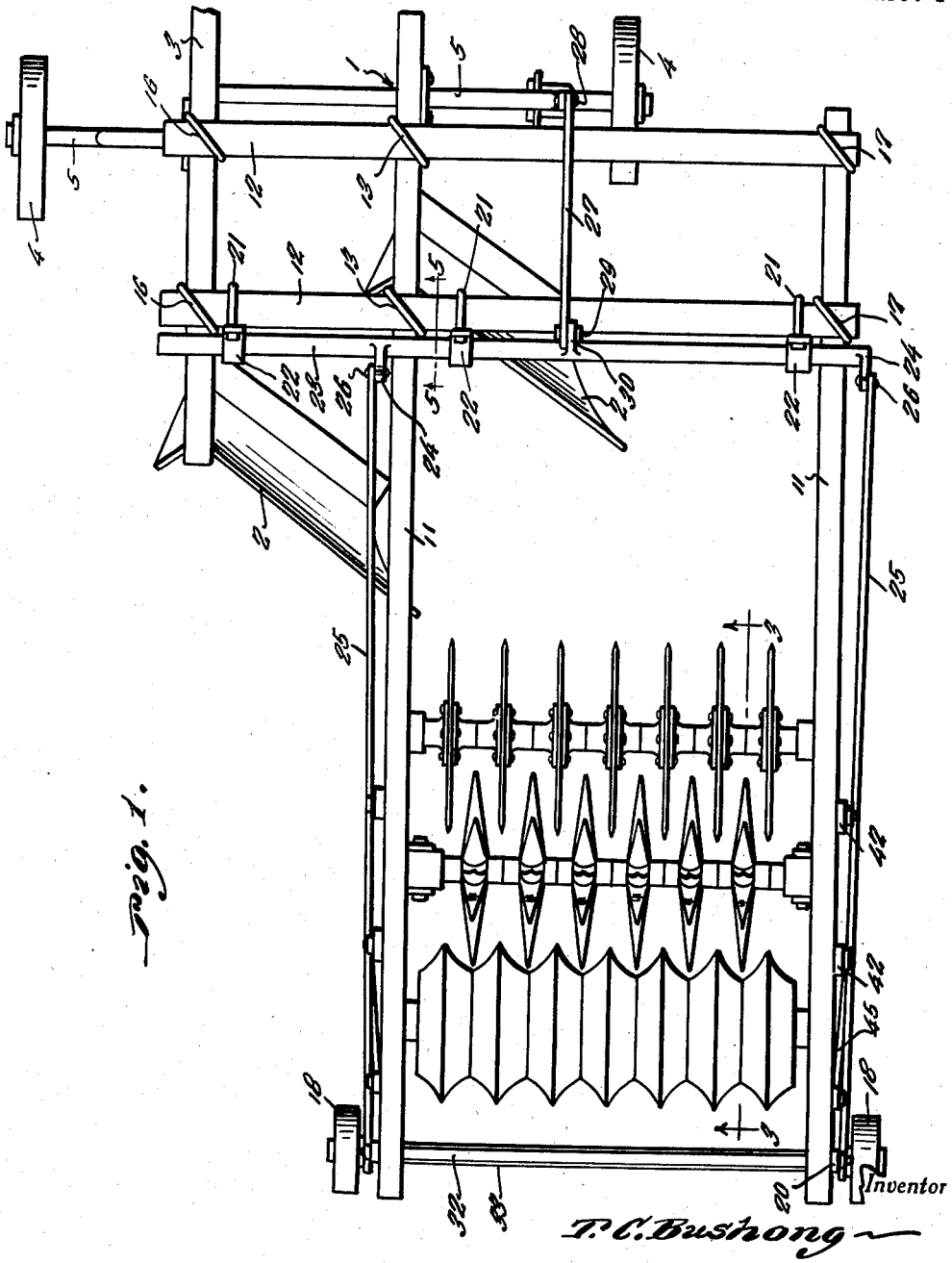

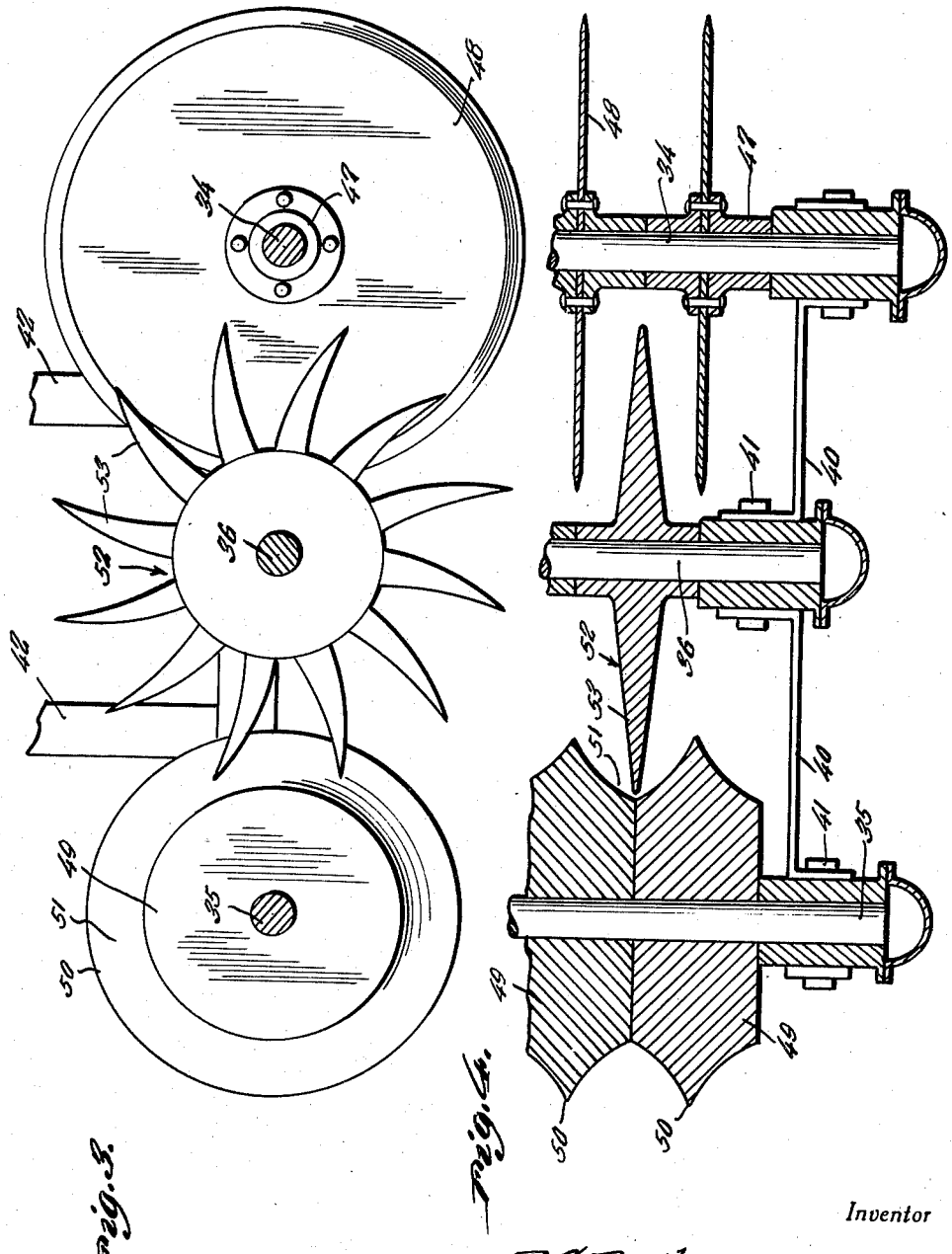

Patented June 18, 1940

2,204,569

UNITED STATES PATENT OFFICE 2,204,569

AGRICULTURAL MACHINE

Tolbert C. Bushong, Waveland, Ind.

Application February 23, 1939, Serial No. 258,087

4 Claims. (Cl. 97—6)

My invention relates to improvements in agricultural machines and more particularly to combination ground working machines.

The principal object in view is to equip a gang plow with a trailing assembly of ground working devices adjustable within a wide range of variation as regard to working depth and coacting to break up the earth thrown up by the plow into finely divided and packed form.

Other and subordinate objects are also comprehended by my invention, all of which, together with the precise nature of my improvement will be readily understood when the succeeding description and claims are read with reference to the drawings accompanying and forming part of this specification.

In said drawings:

Figure 1 is a view in top plan of a preferred embodiment of my invention.

Figure 2 is a view in side elevation.

Figure 3 is a fragmentary view in longitudinal section taken on the line 3—3 of Figure 1 and illustrating details of the ground working assembly.

Figure 4 is a fragmentary view in top plan of said assembly.

Figure 5 is a fragmentary view in transverse section taken on the line 5—5 of Figure 1, and Figure 6 is a similar view taken on the line 6—6 of Figure 2.

Referring to the drawings by numerals, the embodiment of my invention illustrated therein has been shown as attached to a standard type gang plow 1 including a pair of plow-shares 2 having right hand moldboards and mounted in laterally spaced staggered relation on the parallel laterally spaced plow-beam 3 behind a pair of right and left ground wheels 4. The ground wheels 4, in this type of gang plow, are rotatably mounted on separate crank-like axles 5 journalled in bearings 6 on the beams 4 for independent swinging movement forwardly and rearwardly to adjust said wheels and thus lower the shares into the ground at the same or different depths, as occasion may require. The means for swinging said axles 5 have not been shown in the drawings, since such means is well understood in the art and forms, per se, no part of the present invention.

Coming now to my improvements, right hand axle 5 has attached thereto for swinging movement thereby a lever arm 7 secured at its lower end to said axle by bolts 8 passing through clamping bars 9 and nuts 10 on said bolts. The function of the lever arm 7 will presently appear.

A trailing frame for the ground working assembly, to be described, is attached to the plow 1 in a position such that it is off-set to the right so that the assembly will follow the mold turned up by the shares 2, said frame comprising a pair of rearwardly extending, parallel, right and left side bars 11 and a pair of laterally spaced parallel front crossbars 12 extending transversely of the beams 3 and over the side bars 11, one behind the other. The described frame is secured to the beams 3 with the left side bar extending at its front end along the right hand beam 3 and clamped to said beam by U-bolts 13, bars 14 and nuts 15 similar to those on the right hand axle 5. The left hand ends of the cross-bars 13 are similarly clamped to the left hand beam 3, as indicated at 16, while the right hand ends of cross-bars 13 are similarly clamped to the right side bar 11 as indicated at 17. A pair of small ground wheels 18 support the rear end of the described frame, said wheels 18 being rotatable on the lower ends of a pair of standards 19 pivoted at the upper ends thereof, as at 20, to the rear ends of the side bars 11, respectively, to swing forwardly and rearwardly and thereby adjust the height of the rear end of said frame.

Means are provided for swinging the standards 19 simultaneously with the before mentioned axles 5 so that the height of the rear end of the frame may be adjusted simultaneously with that of the front end thereof, said means comprising the following devices.

The rearmost cross-bar 12 has clamped to the rear side thereof, as by U-bolts 21, bearings 22 in which is journalled a transverse rock shaft 23 provided adjacent to the side bars 11 with a pair of crank arms 24. A pair of links 25 are pivoted to said crank arms 24, respectively, as at 26, to extend rearwardly therefrom, said links having their rear ends pivoted to said standards 19, respectively, intermediate the ends of the latter, as at 26'. A link 27 is pivoted at one end, as at 28, to the upper end of the beforementioned lever arm 7 and at its opposite end, as at 29, to a third crank 30 on the shaft 23, whereby under swinging of the right hand axle 5 in opposite directions and consequent raising or lowering, as the case may be, of the plow-shares 2, and the front end of the frame, the standards 19 will be correspondingly swung as regards direction, to raise or lower the rear end of said frame. The standards 19 are provided with bolt holes 31 spaced lengthwise thereof for receiving the pivot 20, whereby the pivotal connection of the standards 19 on the bars 11 may be varied to effect variable, or corresponding, adjustment of both ends of the frame under swinging of said axle 5 and standards 19 as desired. The pivot 20 may take the form of a rod 32 extending across said frame, as shown in Figure 2, and the wheels 18 may be mounted on an axle bar 32 extending between the standards 19.

Describing at this point the ground working assembly, at the rear end of the described frame are three transverse parallel shafts arranged one behind another and hereinafter referred to as the front, rear and intermediate implement shafts 34, 35 and 36. The shafts, 34, 35, and 36 extend clear across the described frame beneath the side bars 11 and in front of the wheels 18. The ends of said shafts 34, 35 and 36 are journalled in front, rear and intermediate bearings, 37, 38 and 39 connected together by side bars 40 and bolts 41. A pair of parallel hanger bars 42 are pivoted at their upper ends to each side bar 11 as at 43, and at the lower ends thereof to each side bar 40, as at 44, said hanger bars suspending the side bars 40, and hence the shafts 34, 35 and 36, for swinging adjustment forwardly and rearwardly for a purpose presently seen. A pair of diagonal bars 45 detachably pivoted at upper ends thereof to the side bars 11, respectively, as at 46, with the lower ends thereof swingable on the pivots 44 provide for retaining the side bars 40 in adjusted position, said bars 45 having spaced apertures 45' therein for selectively varying the pivotal connection to the side bars 11 to compensate for adjustment of the side bars 40.

Rotatably mounted on the front implement shaft 34, by means of hubs 47, is a battery of disk-like ground cutting members 48, spaced apart and equi-distantly along said shaft close together. On the rear implement shaft 35 is a battery of disk-like packing members 49 rotatable on the shaft in side-by-side engaging relation and having transversely sharp bevelled edges 50, said members 49 forming in effect a roller having circumferentially extending, equi-distantly spaced grooves 51 therein and independently rotatable sections. Rotatably mounted on the intermediate implement shaft 36 is a battery of toothed ground breaking members 52, each having the form of sharp elongated and slightly curved spikes 53. The spikes 53 of each member 52 extend between the cutting members 48 and into one of the grooves 52 formed by the members 49, as best shown in Figure 4. The cutting members 48 and breaking members 52 are substantially of the same diameter and sufficiently larger in diameter than the packing members 49 to penetrate well into the ground while the members 49 travel on top of the latter.

As will now be seen, when the described frame comprising the side bars 11 and the cross bars 12, and other related parts, is lowered with the shares 2 in the manner already described, the cutting members 48 and breaking members 52 will penetrate into the plowed mold and the packing members 49 will rotate on top thereof, by adjusting the hanger bars 42 forwardly or rearwardly, as also previously described, the depth at which elements 48 and 52 will penetrate may be varied. Also by adjusting the standards 19 so that pivots 20 enter different holes 31, the angle of the described ground working assembly may be varied so that when it is lowered to the ground the depth to which the ground is worked may be varied, also the pressure exerted by the packing members 49. The hanger bars 42 may be provided with spaced apertures 42' therein for varying the pivotal connection thereof to the side bars 11 to effect further variation in the depth to which the members 48, 52, enter the ground, as will be clear.

In the operation of the described ground working assembly, the cutting members 48 cut and tear the ground and the breaker members 52, working in between members 48 not only break up clods but beat up and pulverize earth picked up by the cutting elements and adhering thereto. The beating and pulverizing is also effected by said members 52 on earth picked up and rotated against the spikes 53 or thrown thereagainst by the packing members 49. As will be seen, said spikes 53 act in the capacity of clod breakers and hoes and also as strippers and beaters and the battery of members 48, 49 and 52 mutually coact in beating and stripping. Packing members 49, also, as will be seen, function both as cutters and packers.

The foregoing will, it is believed, suffice to impart a clear understanding of my invention without further explanation.

Manifestly the invention, as described, is susceptible of modification without departing from the inventive concept and right is herein reserved to such modifications as fall within the scope of the subjoined claims.

What I claim is:

1. The combination with a gang plow having a pair of right and left ground wheels, and a pair of upright axle bars for said wheels swingable on said plow forwardly and rearwardly to elevate and lower the plows, of a frame attached to and extending rearwardly of said plow, a pair of ground wheels at the rear end of said frame, a pair of upright axle bars for said wheels mounted on said frame for forward and rearward swinging movement thereon to elevate and lower the rear end of the frame, a ground working assembly of implements suspended from said frame adjacent said rear end thereof for adjustment into and out of the ground under lowering and elevating of said frame, and operating connections between one of the axles of the pair first mentioned and the pair of second mentioned axles for swinging said second mentioned axles in correspondence with said one axle.

2. The combination with a gang plow having a pair of right and left ground wheels, and a pair of upright axle bars for said wheels swingable on said plow forwardly and rearwardly to elevate and lower the plows, of a frame attached to and extending rearwardly of said plow, a pair of ground wheels at the rear end of said frame, a pair of upright axle bars for said wheels mounted on said frame for forward and rearward swinging movement thereon to elevate and lower the rear end of the frame, a ground working assembly of implements suspended from said frame adjacent said rear end thereof for adjustment into and out of the ground under lowering and elevating of said frame, and operating connections between one of the axles of the pair first mentioned and the pair of second mentioned axles for swinging said second mentioned axles in correspondence with said one axle, said ground working assembly being swingably suspended from said frame for adjustment forwardly and rearwardly to adjust the same vertically independently of adjustment of said frame.

3. The combination with a gang plow, of a frame attached to said plow and extending rearwardly thereof, ground wheels supporting the rear end of said frame, a ground working assembly of implements suspended from said frame adjacent the rear end thereof and including a transversely extending row of rotatably mounted cutting disks closely spaced laterally, a similarly extending row of packing disks in the rear of said row of cutting disks and spaced therefrom, said packing disks being mounted for rotation in side by side engagement and having transversely beveled perimeters forming circumferential grooves between the same, and a transversely extending row of toothed members rotatably mounted intermediate said rows of disks and having the teeth thereof interspersed with said disks and projecting into said grooves.

4. The combination with a gang plow, of a frame attached to said plow and extending rearwardly thereof, a ground wheels supporting the rear end of said frame, a ground working assembly of implements suspended from said frame adjacent the rear end thereof and including a transversely extending row of rotatably mounted cutting disks closely spaced laterally, a similarly extending row of packing disks in the rear of said row of cutting disks and spaced therefrom, said packing disks being mounted for rotation in side by side engagement and having transversely beveled perimeters forming circumferential grooves between the same, and a transversely extending row of toothed members rotatably mounted intermediate said rows of disks and having the teeth thereof interspersed with said disks and projecting into said grooves, the cutting disks and toothed members being larger in diameter than the packing disks.

TOLBERT C. BUSHONG.